United States Patent
Nara et al.

(10) Patent No.: US 6,337,872 B1
(45) Date of Patent: Jan. 8, 2002

(54) ONCE THROUGH FAN FOR EXCIMER LASER APPARATUS

(75) Inventors: Hisashi Nara, Hiratsuka; Kiyoharu Nakao, Isehara; Hakaru Mizoguchi; Toshihiro Nishisaka, both of Hiratsuka; Tatsuo Enami, Yokohama, all of (JP)

(73) Assignees: Komatsu Ltd.; Ebara Corporation, both of Tokyo (JP)

( * ) Notice: Subject to any disclaimer, the term of this patent is extended or adjusted under 35 U.S.C. 154(b) by 0 days.

(21) Appl. No.: 09/422,857

(22) Filed: Oct. 25, 1999

(30) Foreign Application Priority Data

Oct. 29, 1998 (JP) .............................. 10-324574

(51) Int. Cl.⁷ ............................ H01S 3/22; H01S 3/223
(52) U.S. Cl. ........................................... 372/58; 372/57
(58) Field of Search ...................................... 372/57, 58

(56) References Cited

U.S. PATENT DOCUMENTS

| | | | |
|---|---|---|---|
| 5,048,041 A | * 9/1991 | Akins et al. | 372/57 |
| 5,770,933 A | * 6/1998 | Larson et al. | 318/254 |
| 5,848,089 A | * 12/1998 | Sarkar et al. | 372/58 |
| 6,018,537 A | * 1/2000 | Hofmann et al. | 372/25 |
| 6,208,675 B1 | * 3/2001 | Webb | 372/58 |

FOREIGN PATENT DOCUMENTS

JP         10-173259        6/1998

* cited by examiner

*Primary Examiner*—James W. Davie
*Assistant Examiner*—Davienne Monbleau
(74) *Attorney, Agent, or Firm*—Armstrong, Westerman, Hattori, McLeland & Naughton, LLP.

(57) ABSTRACT

The invention provides an once through fan for an excimer laser apparatus having a reduced vibration and being capable of increasing a rotational speed. In order to obtain this, in an once through fan (1) for an excimer laser apparatus provided with a blade portion (6) having a plurality of blades, a rotary shaft (4) for rotating the blade portion and a magnetic bearing (7) rotatably supporting the rotary shaft in a non-contact manner so as to circulate a laser gas sealed within a chamber (2) in accordance with a rotation of the blade portion, a rotor (21) of a motor (23) installed within the chamber (2) and rotating the rotary shaft (4) is mounted on an outer peripheral portion of the rotary shaft, and at least one magnetic bearing (7, 7) for supporting the rotary shaft is arranged in each of both sides in an axial direction of the rotor.

7 Claims, 3 Drawing Sheets

ONCE THROUGH FAN FOR EXCIMER LASER APPARATUS

FIELD OF THE INVENTION

The present invention relates to an once through fan for circulating a laser gas of an excimer laser apparatus, and more particularly to an once through fan for an excimer laser apparatus having a small vibration and being capable of rotating at a high rotational speed.

BACKGROUND OF THE INVENTION

Conventionally, an once through fan in which a rotary shaft is supported by a magnetic bearing has been known as an once through fan for circulating a laser gas of an excimer laser apparatus.

FIGS. 5 and 6 show an embodiment which the applicant of this patent application disclosed in Japanese Patent Unexamined Publication No. 10-173259. FIG. 5 is a side elevational cross sectional view which shows a total structure of an excimer laser apparatus and FIG. 6 is a detailed view of a P portion in FIG. 5. Hereinafter, a prior art will be described on the basis of these drawings.

A laser gas corresponding to a medium for oscillating a laser beam is sealed within a chamber 2 of the excimer laser apparatus. An once through fan 1 provided with a rotary shaft 4 and a blade portion 6 having a plurality of blades is arranged at a predetermined position of the chamber 2, and it is structured such as to circulate a laser gas so as to introduce between discharge electrodes 3 and 3 by applying a driving force to the rotary shaft 4 so as to rotate the blade portion 6. The excimer laser apparatus applies a predetermined high voltage between the discharge electrodes 3 and 3, thereby exciting a laser gas and oscillating a laser beam.

The once through fan 1 is structured such that the rotary shaft 4 thereof is rotatably supported by non-contact magnetic bearings 7 and 7. The magnetic bearings 7 and 7 are provided with permanent magnets 10 and 10 which are annually mounted on an outer periphery of the rotary shaft 4 and integrally rotating with the rotary shaft 4 and permanent magnets 11 and 11 which annually surround an outer periphery of the permanent magnets 10 and 10 at a predetermined interval. Then, an opposing surface between the permanent magnet 10 and the permanent magnet 11 is set to the same pole, and the rotary shaft 4 is rotatably supported in a non-contact state by utilizing a repulsion force between the permanent magnets 10, 10, 11 and 11.

Further, a permanent magnet 13 is mounted to an end (a right end in the drawing) of the rotary shaft 4 in the once through fan 1, and the permanent magnet 13 is opposed to a permanent magnet 14 via a barrier portion 12. The permanent magnet 14 is mounted to a motor rotary shaft 17 of a motor 15 mounted to an outer wall of the chamber 2, and the permanent magnets 13 and 14 and the barrier portion 12 constitute a magnetic torque coupling 16 for transmitting a drive force of the motor 15 to the once through fan 1.

However, in the excimer laser apparatus, since a pressure of a laser gas is high (normally 2 atmospheric pressure or more), a resistance of the laser gas is great when the once through fan 1 rotates therewithin, so that the once through fan 1 terribly vibrates. This vibration is transmitted to the chamber 2 and an optical axis of an optical part (not shown) in the excimer laser apparatus is shifted, so that there is a case that a characteristic of the laser beam is deteriorated.

Further, since the rotary shaft 4 of the once through fan 1 and the motor rotary shaft 17 are separated, it is hard to completely coincide center axes for rotation of the both, so that there is a case that the center of the rotation is shifted. Accordingly, an ununiform force is applied to the rotary shaft 4 and the once through fan 1 is vibrated, however, means for restricting the vibration of the once through fan 1 is not disclosed in the publication mentioned above.

Further, in recent years, there is a requirement of increasing an oscillating frequency of the laser beam so as to improve a capacity for processing in the case of performing a light beam process such as a lithography or the like by using an excimer laser apparatus as a light source. In order to increase the oscillating frequency of the laser beam, it is necessary to increase the rotational speed of the once through fan 1 so as to increase a flow amount of the circulating laser gas, however, in the case of the conventional once through fan 1, the vibration is terribly generated and the rotational speed can not be increased.

Further, in the prior art, the rotation of the motor 15 is transmitted to the once through fan 1 via the magnetic torque coupling 16. At this time, when increasing the rotation of the motor 15, a load for rotating the once through fan 1 is increased, so that there is a case that the permanent magnet 13 slips with respect to the rotation of the permanent magnet 14 and can not follow the rotation of the permanent magnet 14. Accordingly, the torque of the motor 15 is not transmitted to the once through fan 1 and the rotational speed of the once through fan 1 can not be increased.

SUMMARY OF THE INVENTION

The present invention is made by taking the problems mentioned above into consideration, and an object of the present invention is to provide an once through fan for an excimer laser apparatus in which a vibration is reduced and a rotational speed can be increased.

In order to achieve the object mentioned above, in accordance with a first aspect of the present invention, there is provided an once through fan for an excimer laser apparatus, comprising a blade portion having a plurality of blades, a rotary shaft for rotating the blade portion and a magnetic bearing rotatably supporting the rotary shaft in a non-contact manner so as to circulate a laser gas sealed within a chamber in accordance with a rotation of the blade portion, wherein a rotor of a motor installed within the chamber and rotating the rotary shaft is mounted on an outer peripheral portion of the rotary shaft.

In accordance with the first embodiment, the rotor is mounted to the rotary shaft of the once through fan and a stator is arranged in such a manner as to surround the outer peripheral portion thereof, whereby the rotor and the stator constitute the motor. As mentioned above, since the rotary shaft of the motor corresponding to the drive source and the rotary shaft of the once through fan are made the same, the center axes of the rotation of the both coincide with each other, and it is possible to drive the rotary shaft by a uniform force. Further, in comparison with the case that the connecting portion or the like is provided in the middle of the rotary shaft, it is possible to adjust a rotational balance of the rotary shaft in a significantly accurate manner.

Accordingly, since the vibration of the once through fan is reduced, the optical axis of the optical element of the excimer laser apparatus is hardly shifted, and the characteristic of the laser beam is stabilized.

Further, since the motor rotary shaft and the rotary shaft of the once through fan are made the same, the drive force is transmitted with no loss. Further, since there is no connection portion in the middle of the rotary shaft, a strength of the rotary shaft is increased, so that the rotary shaft is not twisted even when increasing the rotational speed.

Accordingly, since it is possible to rotate the once through fan at a higher rotational speed, it is possible to increase a circulating flow amount of the laser gas so as to increase the oscillating frequency of the laser beam.

In accordance with a second aspect of the present invention, there is provided an once through fan as recited in the first aspect, wherein at least one magnetic bearing for supporting the rotary shaft is arranged in an outer side in an axial direction of the rotor.

In accordance with the second aspect, the magnetic bearing is arranged in the outer side of the rotor. Accordingly, since the rotor having a heavy weight is arranged in an inner side of the magnetic bearing supporting the rotary shaft, it is possible to support the weight of the rotor in a more stable manner, so that the vibration of the once through fan is reduced.

In accordance with a third aspect of the present invention, there is provided an once through fan as recited in the first aspect, wherein at least one magnetic bearing for supporting the rotary shaft is arranged in each of both sides in an axial direction of the rotor.

In accordance with the third aspect, the magnetic bearings are arranged in both sides of the rotor. Accordingly, since the rotors corresponding to the drive source and having a heavy weight are arranged in the inner sides of two magnetic bearings, the rotor can be supported in a more stable manner and the vibration thereof can be reduced.

In accordance with a fourth aspect of the present invention, there is provided an once through fan as recited in the third aspect, wherein a magnetic force of the magnetic bearing arranged between the rotor and the blade portion is set to be greater than a magnetic force of the magnetic bearing arranged in a portion except the portion therebetween.

In accordance with the fourth aspect, the magnetic bearing having the magnetic force stronger than that of the other magnetic bearings is arranged between the rotor and the blade portion. That is, since the magnetic bearing having the strongest magnetic force is arranged near the center portion of the rotary shaft which has the greatest amplitude of the vibration of the rotary shaft and to which the weight heavier than the other magnetic bearings is applied, it is possible to effectively restrict the vibration of the rotary shaft.

In accordance with a fifth aspect of the present invention, there is provided an once through fan as recited in the third aspect, wherein a length in a direction of the rotary shaft of the magnetic bearing arranged between the rotor and the blade portion is set to be longer than a length in a direction of the rotary shaft of the magnetic bearing arranged in a portion except the portion therebetween.

In accordance with the structure of the fifth aspect, since it is possible to restrict the vibration near the center portion of the rotary shaft in a wide range, it is possible to restrict the vibration of the rotary shaft in a more effective manner.

DETAILED DESCRIPTION OF PREFERRED EMBODIMENTS

Figure 1:
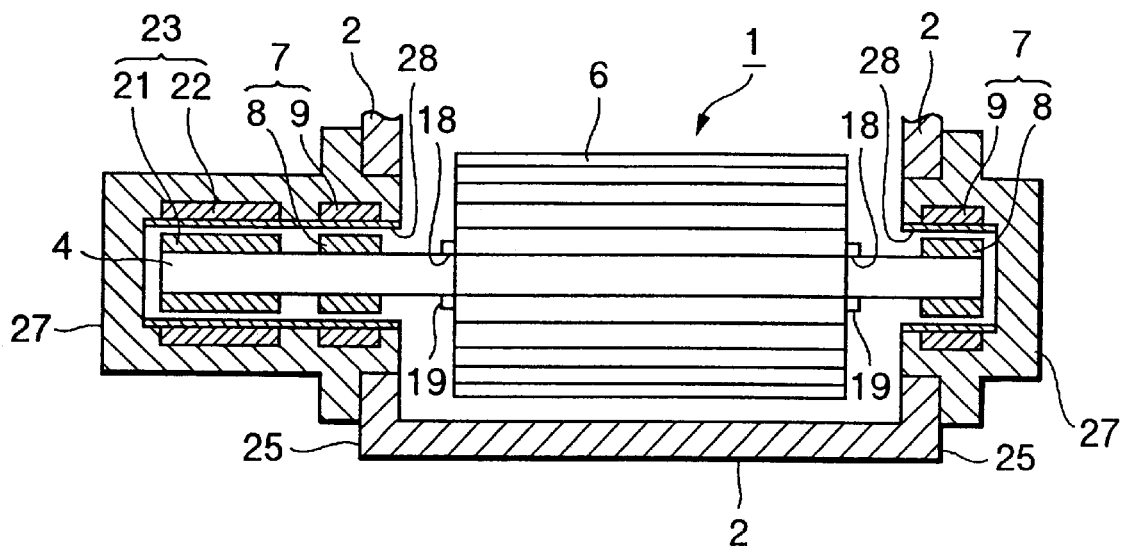
FIG. 1 is a partly cross sectional view of an excimer laser apparatus employing an once through fan in accordance with a first embodiment of the present invention.

Hereinafter, embodiments in accordance with the present invention will be described in detail with reference to the drawings. In this case, in each of the embodiments, the same reference numerals will be attached to the same elements which were used in the drawings of the description of the prior art mentioned above and the drawings of the description of the embodiments previously described, and an overlapping description will be omitted.

At first, a first embodiment will be described below with reference to FIG. 1. FIG. 1 is a partly cross sectional view of an excimer laser apparatus employing an once through fan 1 in accordance with the present embodiment.

In the drawing, a laser gas is sealed within a chamber 2. The once through fan 1 is arranged at a predetermined position of the chamber 2, and a laser gas is circulated by the once through fan 1 and fed between discharge electrodes (not shown). The excimer laser apparatus applies a high voltage between the discharge electrodes so as to generate an electric discharge, and oscillates a laser beam by exciting the laser gas.

Then, the once through fan 1 is provided with a blade portion 6 having a plurality of blades for circulating a laser gas, one rotary shaft 4 passing through a center of the blade portion 6, and a motor 23 for driving a blade portion.

Fitting members 19 and 19 having fitting holes 18 and 18 for inserting the rotary shaft 4 are mounted to both end portions of the blade portion 6, and the rotary shaft 4 is inserted to the fitting holes 18 and 18 and fixed by means of a fastening screw or the like (not shown).

Both end portions of the rotary shaft 4 pass through side walls 25 and 25 of the chamber 2 and are rotatably supported by magnetic bearings 7 and 7 placed within housings 27 and 27 mounted to outer sides of the side walls 25 and 25 by fixing means (not shown) such as a bolt or the like.

In this case, the housings 27 and 27 are provided with sealing means (not shown) such as an O ring or the like, thereby preventing the laser gas from leaking to an outer portion of the chamber 2.

A rotor 21 made of, for example, a ferromagnetic metal or a permanent magnet is mounted to an outer peripheral portion in an axial direction of the magnetic bearing 7 arranged in one side (a left side in the drawing) of the rotary shaft 4. An outer periphery of the rotor 21 is surrounded by a stator 22, for example, comprising a coil and an iron core at a distance of a thin partition wall 28 provided on an inner peripheral surface of the housing 27.

The stator 22 and the rotor 21 constitute a motor 23 (in this case, a synchronous type motor), and it is possible to rotate the rotor 21 by energizing a coil of the stator 22 for generating a rotating magnetic field.

Then, the rotary shaft 4 rotates in accordance with a rotation of the rotor 21 and the rotation rotates the blade portion 6 of the once through fan 1 so as to circulate the laser gas.

The magnetic bearings 7 and 7 in both sides are provided with inner ring magnets 8 and 8 annually mounted so as to surround the outer periphery of the rotary shaft 4 and integrally rotating with the rotary shaft 4, and outer ring magnets 9 and 9 surrounding the outer periphery of the inner ring magnets 8 and 8 at a distance of the thin partition walls 28 and 28 and mounted to the inner walls of the housings 27 and 27. The inner ring magnets 8 and 8 and the outer ring magnets 9 and 9 are, for example, constituted by permanent magnets, and opposing surfaces between the inner ring magnets 8 and 8 and the outer ring magnets 9 and 9 are set to be the same magnetic poles. Then, the rotary shaft 4 is rotatably supported in a non-contact state by employing a repulsion force between the magnetic poles, and the vibration of the rotary shaft 4 can be restricted.

At this time, when using a resin for parts within the excimer laser apparatus, there is a problem that the oscillating laser beam is brought into contact with the resin and an impurity is generated, so that it is desirable that a resin such as a Teflon or the like is not used for the magnetic bearings 7 and 7.

As mentioned above, in accordance with the present embodiment, the once through fan 1 has a rotary shaft 4 passing through the blade portion 6 and the rotary shaft 4 constitutes the rotary shaft of the motor 23 for driving the blade portion 6.

That is, since the rotary shaft 4 of the once through fan 1 and the rotary shaft of the motor 23 are the same, it is possible to drive the rotary shaft 4 by a uniform force. Further, since there is no connecting portion in the rotary shaft 4, a center shaft for rotation of the once through fan 1 and a center shaft for rotation of the motor 23 coincide with each other, so that it is possible to adjust a rotating balance thereof in a significantly accurate manner. Accordingly, the vibration generated from the once through fan 1 at a time of rotation becomes very small, the optical axis of the optical element of the excimer laser apparatus is hardly shifted due to an influence thereof.

Further, since the vibration of the rotary shaft 4 is small, it is not necessary to set a rigidity of the magnetic bearings 7 and 7 to a very strong level, so that it is possible to reduce a size of the magnetic bearings 7 and 7 and it is possible to restrict the cost thereof to a low level.

Further, since the drive force of the motor 23 is directly transmitted to the once through fan 1 via one rotary shaft 4, there is no loss of the drive force. Further, since the rotary shaft 4 has no connecting portion, a strength of the rotary shaft 4 is increased.

Accordingly, it is possible to increase the rotational speed of the motor 23 so as to increase a circulating flow amount of the laser gas, thereby increasing the oscillating frequency of the excimer laser apparatus.

Additionally, since the strength of the rotary shaft 4 is increased, it is possible to make the diameter of the rotary shaft 4 to a narrower level. Accordingly, the flow of the laser gas passing through the blade portion 6 of the once through fan 1 is hardly prevented by the rotary shaft 4, so that a smoother current can be generated. As a result, since the flow amount of the circulating laser gas is increased with respect to the same rotational speed, it is possible to increase the oscillating frequency of the excimer laser apparatus.

Further, as a material for the rotary shaft 4, it is preferable to employ a material having a relatively high Young's modulus, for example, SUS316, a ceramic composite material or the like. Because a resonance frequency of the rotary shaft 4 is increased by employing such a material and the vibration is not increased so much even when increasing the rotational speed of the motor 23.

The outer ring magnets 9 and 9 and the inner ring magnets 8 and 8 may be an electromagnet. A magnetic force of the outer ring magnets 9 and 9 and the inner ring magnets 8 and 8 can be made stronger so as to increase the repulsion force by setting them to the electromagnets, so that it is possible to increase an effect of restricting the vibration of the once through fan 1 and the motor 23 by a magnetic force.

Further, since it is possible to electrically control a direction of the magnetic field and the magnetic force, it is possible to restrict the vibration of the once through fan 1 to a smaller level by detecting an interval between the inner ring magnet 8 and the outer ring magnet 9 in the magnetic bearing and controlling the direction of the magnetic field and the magnetic force so as to make the interval uniform.

In accordance with the present embodiment, it is structured such as to shield the outer ring magnets 9 and 9 and the stators 22 and 22 from the laser gas so as not to bring them into contact with each other by the thin partition walls 28 and 28. In addition, the outer ring magnets 9 and 9 and the stators 22 and 22 are structured such that the outer peripheries are covered by an insulating material so as to be insulated from the housings 27 and 27.

The insulating material generates an impure gas in accordance with a chemical reaction when being brought into contact with the laser gas, thereby deteriorating the laser gas. However, since the outer ring magnets 9 and 9 and the stators 22 and 22 are shielded from the laser gas by the thin partition walls 28 and 28, it is possible to prevent the laser gas from deteriorating so as to obtain a long service life of the laser gas.

Figure 2:
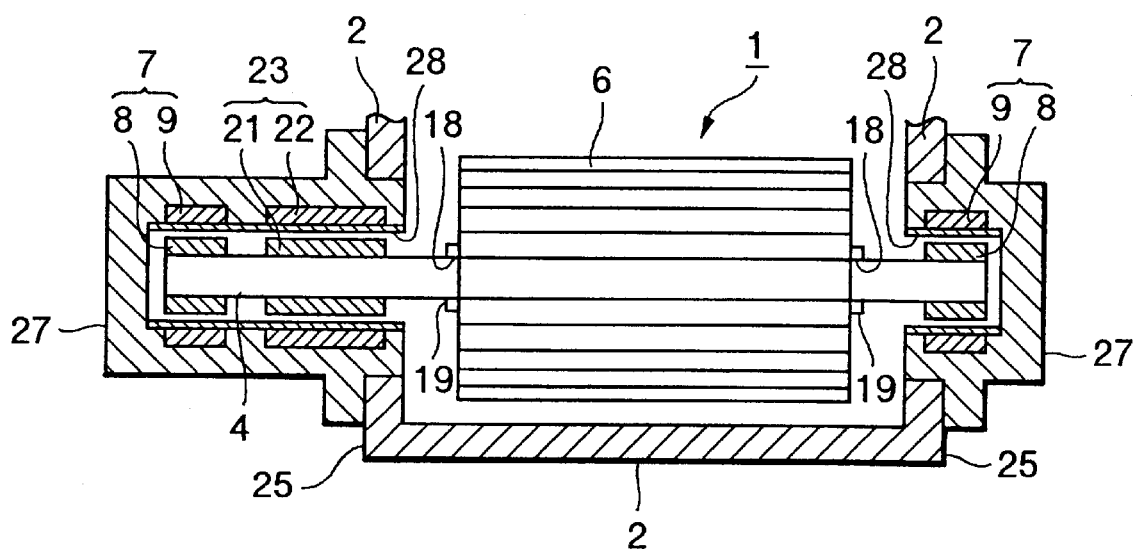
FIG. 2 is a partly cross sectional view of an excimer laser apparatus employing an once through fan in accordance with a second embodiment.

Next, a second embodiment will be described below with reference to FIG. 2. FIG. 2 is a partly cross sectional view of an excimer laser apparatus using an once through fan 1 in accordance with the present embodiment.

In FIG. 2, the once through fan 1 is provided with the blade portion 6 and the rotary shaft 4, and the rotary shaft 4 is supported to the magnetic bearings 7 and 7 having the same structure as that of the first embodiment at both end portions.

Then, the rotor 21 is mounted to the outer peripheral portion of the rotary shaft 4 disposed between the blade portion 6 and the magnetic bearing 7 in one side (a left side in the drawing) of the rotary shaft 4, and the stator 22 surrounds the outer periphery thereof via the partition wall 28 in the same manner as that of the first embodiment.

That is, in accordance with the present embodiment, the magnetic bearings 7 and 7 for supporting the rotary shaft 4 are arranged in an outer side (both ends) in an axial direction of the rotor 21 and the blade portion 6. Accordingly, since the rotor 21 having a heavy weight is arranged in an inner side of the magnetic bearings 7 and 7 disposed at both ends in addition to a reduction of the vibration obtained by directly connecting the blade portion 6 and the motor 23 by one rotary shaft 4, the rotor 21 can be supported in a more stable manner.

Accordingly, the vibration of the excimer laser apparatus can be further reduced, and a characteristic of the laser beam can be made stable.

Figure 3:
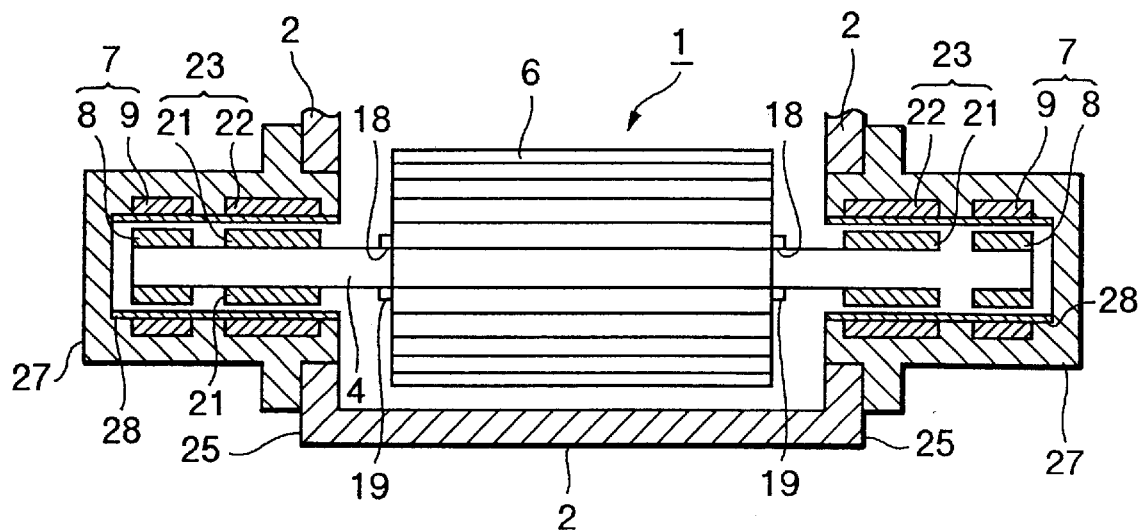
FIG. 3 is a partly cross sectional view of an excimer laser apparatus which shows another embodiment of the once through fan in accordance with the second embodiment.

In this case, as the other modification of the present embodiment, as shown in FIG. 3, the structure may be made such that the motors 23 and 23 are arranged in both sides of the rotary shaft 4, the once through fan 1 is driven from both sides, and the magnetic bearings 7 and 7 are respectively arranged in the outer side (both ends). When the structure is made in this manner, a weight balance between the right and the left around the blade portion 6 can be unified, and the vibration of the once through fan 1 can be further restricted.

Figure 4:
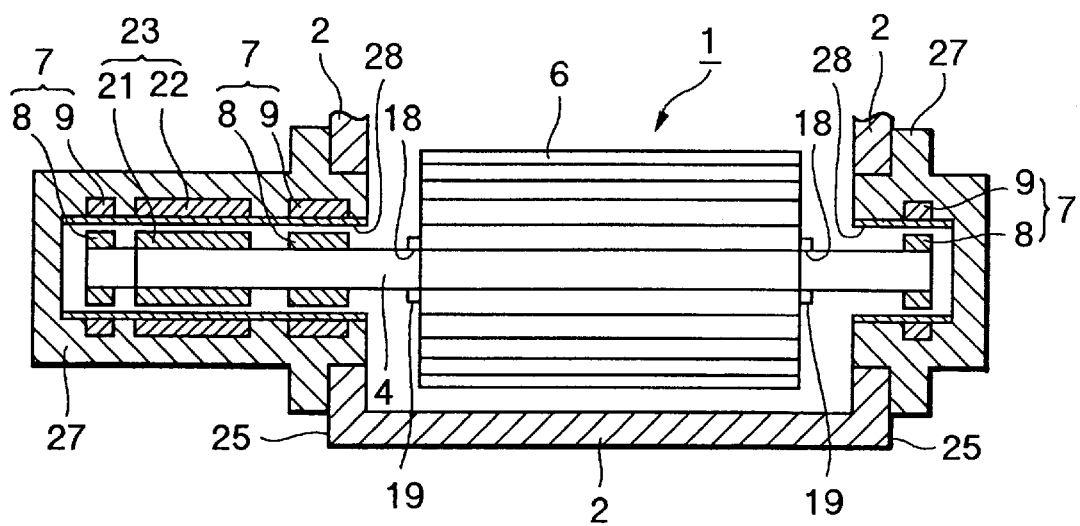
FIG. 4 is a partly cross sectional view of an excimer laser apparatus in accordance with a third embodiment.
Figure 5:
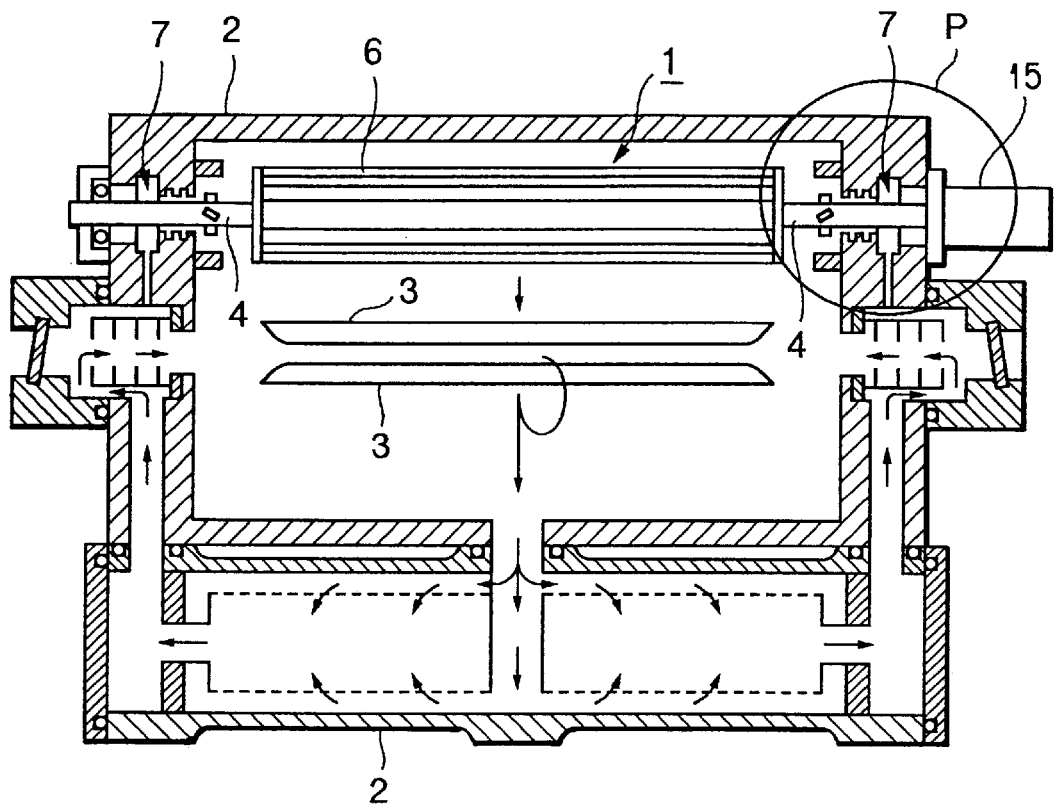
FIG. 5 is a cross sectional view of an excimer laser apparatus in accordance with a prior art.
Figure 6:
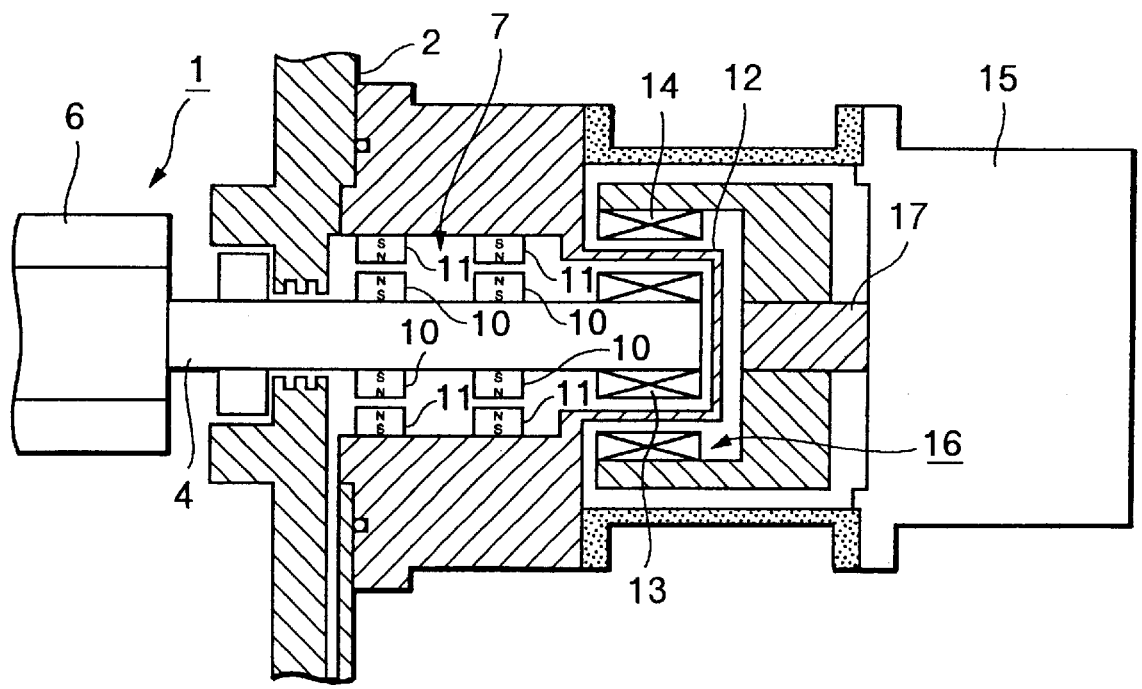
FIG. 6 is a detailed view of a P portion of the excimer laser apparatus shown in FIG. 5.

Next, a third embodiment will be described below with reference to FIG. 4. FIG. 4 is a partly cross sectional view of an excimer laser apparatus employing an once through fan 1 in accordance with the present embodiment.

In FIG. 4, the once through fan 1 is provided with a blade portion 6, a rotary shaft 4 and a rotor 21 which are the same as those of the first embodiment. Then, the rotary shaft 4 is also supported by a magnetic bearing 7 disposed between the rotor 21 and the blade portion 6 in addition to the magnetic bearings 7 and 7 at both ends.

Accordingly, since the magnetic bearings 7 and 7 are arranged in both sides of the rotor 21 which has a heavy weight and terribly vibrates because it corresponds to a drive source, it is possible to support the rotor 21 in a stable manner and the vibration can be reduced.

Additionally, in the vibration of the rotary shaft 4, the amplitude becomes greatest at a portion between the rotor 21 and the blade portion 6, however, it is possible to effectively restrict the vibration due to the repulsion force between the inner ring magnet 8 and the outer ring magnet 9 obtained by further arranging the magnetic bearing 7 at this position.

Further, when arranging the motor 23 in accordance with the present embodiment in both sides of the rotary shaft 4 as shown in FIG. 3, the weight balance between the right and the left is unified, so that it is further preferable.

Further, it is desirable that the magnetic bearing 7 arranged between the rotor 21 and the blade portion 6 has a magnetic force stronger than that of the magnetic bearings 7 and 7 arranged at both ends of the rotary shaft 4. That is, it is possible to more effectively restrict the vibration of the rotary shaft 4 by newly arranging the magnetic bearing 7 having the stronger magnetic force near the center portion of the rotary shaft 4 which is considered to be the portion which has the greatest amplitude of the rotary shaft 4 and to which the weight heavier than the magnetic bearings 7 and 7 at both ends.

Additionally, it is desirable that a length in a direction of the rotary shaft 4 of the magnetic bearing 7 arranged between the rotor 21 and the blade portion 6 is longer than a length of the magnetic bearings 7 and 7 arranged at both ends of the rotary shaft 4. Accordingly, since it is possible to restrict the vibration near the center portion of the rotary shaft 4 in a wide range, it is possible to effectively restrict the vibration of the rotary shaft 4.

In this case, between the rotor 21 and the blade portion 6, it is possible to arrange two or more magnetic bearings 7 and 7 in series in a longitudinal direction of the rotary shaft 4.

As mentioned above, the present invention has an effect of reducing the vibration of the once through fan 1 for the excimer laser apparatus and stabilizing the characteristic of the laser beam. Further, since it is possible to increase the rotational speed of the once through fan 1 in accordance with the structure mentioned above, it is possible to increase the flow amount of the circulating laser gas so as to increase the oscillating frequency of the laser beam of the excimer laser apparatus.

In this case, in each of the embodiments mentioned above, the description is given to the case that the magnetic bearings 7 and 7 are arranged within the housings 27 and 27 provided in the outer side of the chamber 2, however, the present invention is not limited to this aspect. For example, the structure may be made such that the magnetic bearings 7 and 7 are arranged within the chamber 2 and supported by a bracket protruding from the inner surface of the chamber 2.

Further, the description is given to the case that the partition walls 28 and 28 are provided between the inner ring magnets 8 and 8 and the outer ring magnets 9 and 9 in the magnetic bearings 7 and 7, however, this structure is not limited to this aspect and the structure can be applied to the magnetic bearings 7 and 7 which has no partition walls 28 and 28.

Further, the description is given to the case that the rotor 21 is set to the ferromagnetic body or the permanent magnet and the motor 23 is set to the synchronous type motor, however, the motor 21 may be set to a cage-shaped conductive body, and in this case, the motor 23 is an induction type motor.

What is claimed is:

1. A once through fan for an excimer laser apparatus, comprising a blade portion having a plurality of blades, a rotary shaft for rotating the blade portion and a magnetic bearing rotatably supporting the rotary shaft in a non-contact manner so as to circulate a laser gas sealed within a chamber in accordance with a rotation of the blade portion, wherein a rotor of a motor installed within said chamber and rotating said rotary shaft is mounted on an outer peripheral portion of the rotary shaft, and wherein at least one magnetic bearing for supporting said rotary shaft is arranged in an outer side in an axial direction of said rotor.

2. A once through fan for an excimer laser apparatus, comprising a blade portion having a plurality of blades, a rotary shaft for rotating the blade portion and a magnetic bearing rotatably supporting the rotary shaft in a non-contact manner so as to circulate a laser gas sealed within a chamber in accordance with a rotation of the blade portion, wherein a rotor of a motor installed within said chamber and rotating said rotary shaft is mounted on an outer peripheral portion of the rotary shaft, and wherein at least one magnetic bearing for supporting said rotary shaft is arranged in each of both sides in an axial direction of said rotor.

3. A once through fan for an excimer laser apparatus as claimed in claim 2, wherein a magnetic force of a magnetic bearing arranged between said rotor and said blade portion is set to be greater than a magnetic force of the magnetic bearing arranged in a portion other than the portion between said rotor and said blade portion.

4. A once through fan for an excimer laser apparatus as claimed in claim 2, wherein a length in a direction of the rotary shaft of a magnetic bearing arranged between said rotor and said blade portion is set to be longer than a length in a direction of the rotary shaft of the magnetic bearing arranged in a portion other than the portion between said rotor and said blade portion.

5. A once through fan for an excimer laser apparatus comprising a blade portion having a plurality of blades, a rotary shaft for rotating the blade portion, a magnetic bearing rotatably supporting the rotary shaft in a non-contact manner, and a rotor of a motor installed within a chamber and rotating said rotary shaft, which is mounted on an outer peripheral of the rotary shaft so as to circulate a laser gas sealed within said chamber in accordance with a rotation of the blade portion, wherein at least one magnetic bearing for supporting said rotary shaft is arranged in both sides in an axial direction of said blade portion, said rotor is arranged in an outer side of the one magnetic bearing, and a magnetic force of a magnetic bearing arranged between said rotor and said blade portion is set to be greater than a magnetic force of the magnetic bearing arranged in a portion other than the portion between said rotor and said blade portion.

6. A once through fan for an excimer laser apparatus comprising a blade portion having a plurality of blades, a rotary shaft for rotating the blade portion, a magnetic bearing rotatably supporting the rotary shaft in a non-contact manner, and a rotor of a motor installed within a chamber and rotating said rotary shaft, which is mounted on an outer peripheral of the rotary shaft so as to circulate a laser gas sealed within said chamber in accordance with a rotation of the blade portion, wherein at least one magnetic bearing for supporting said rotary shaft is arranged in both sides in an axial direction of said blade portion, said rotor is arranged in an outer side of the one magnetic bearing, and a length in a direction of the rotary shaft of a magnetic bearing arranged between said rotor and said blade portion is set to be longer than a length in a direction of the rotary shaft of the magnetic bearing arranged in a portion other than the portion between said rotor and said blade portion.

7. A once through fan for an excimer laser apparatus comprising a blade portion having a plurality of blades, a rotary shaft for rotating the blade portion, a magnetic bearing rotatably supporting the rotary shaft in a non-contact manner, and a rotor of a motor installed within a chamber and rotating said rotary shaft, which is mounted on an outer peripheral of the rotary shaft so as to circulate a laser gas sealed within said chamber in accordance with a rotation of the blade portion, wherein at least one magnetic bearing for supporting said rotary shaft is arranged in both sides in an axial direction of said blade portion, said rotor is arranged in an outer side of the one magnetic bearing, and a magnetic force of a magnetic bearing arranged between said rotor and said blade portion is set to be greater than a magnetic force of the magnetic bearing arranged in a portion other than the portion between said rotor and said blade portion, and further a length in a direction of the rotary shaft of a magnetic bearing arranged between said rotor and said blade portion is set to be longer than a length in a direction of the rotary shaft of the magnetic bearing arranged in a portion other than the portion between said rotor and said blade portion.

* * * * *